Feb. 27, 1962   J. ROMEO   3,022,967
COPTER KITE
Filed Feb. 9, 1959
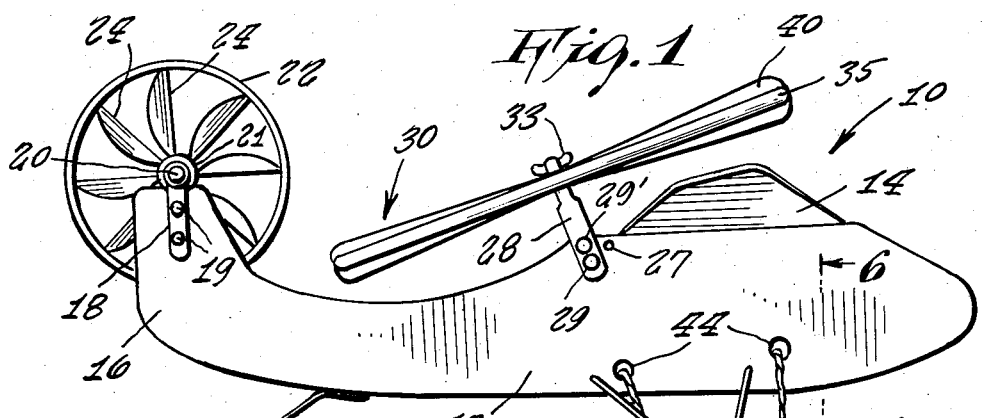
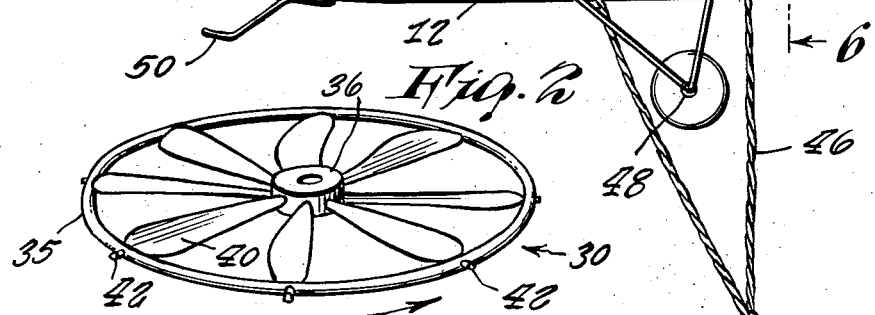
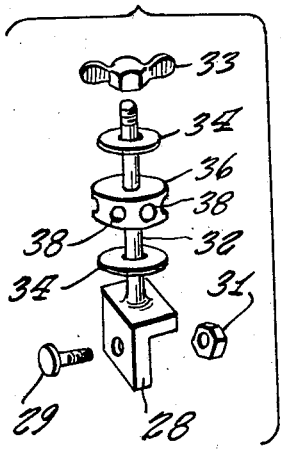
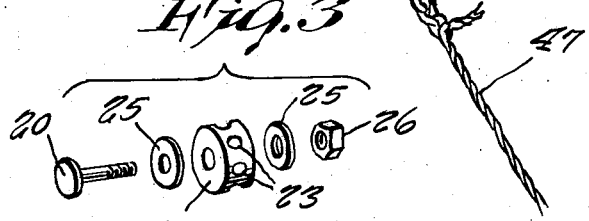
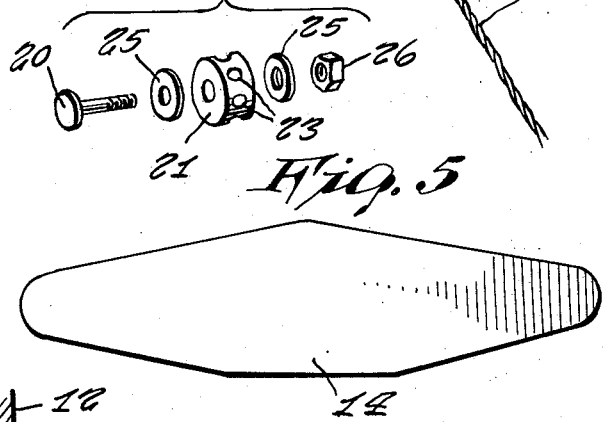
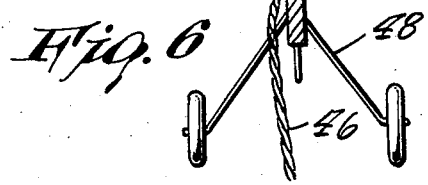
INVENTOR.
JOHN ROMEO
BY
Carl Miller
ATTORNEY

United States Patent Office 3,022,967
Patented Feb. 27, 1962

3,022,967
COPTER KITE
John Romeo, 238 Everett Ave., Wyckoff, N.J.
Filed Feb. 9, 1959, Ser. No. 792,061
1 Claim. (Cl. 244—154)

This invention relates to kites and, more particularly, to an aircraft simulating kite.

Various attempts have been made to provide a kite that simulates a helicopter in flight. In many instances, such attempts have resulted in various kites having inanimate or fragile parts that detract from the authenticity and usefulness thereof. It is therefore an object of the present invention to provide a helicopter simulated kite that is extremely simple in construction, is provided with rotating rotors, and a bridle for controlling flight from the ground.

Another object of the present invention is to provide a helicopter type kite having a main rotor rotatably supported within a plane defining an acute angle with a flight sustaining wing and substantially perpendicular to the direction of pull upon the ground control cable.

An additional object of the present invention is to provide a helicopter simulated kite of the type described that can be efficiently manufactured in large quantities at a relatively low cost, is simple to assemble, and substantially sturdy in use.

All of the foregoing and still further objects and advantages of this invention will become apparent from a study of the following specification, taken in connection with the accompanying drawing, wherein:

FIGURE 1 is a side elevational view of a helicopter kite made in accordance with the present invention in operative use;

FIGURE 2 is a perspective view of a main rotor forming a part of the present invention;

FIGURE 3 is an exploded perspective view of the mounting of the tail rotor forming another part of the present invention;

FIGURE 4 is an exploded perspective view of the mounting for the main rotor;

FIGURE 5 is a plan view of a wing forming another part of the present invention; and FIGURE 6 is a fragmentary cross sectional view taken along line 6—6 of FIGURE 1.

Referring now to the drawing, and more particularly to FIGURE 1 thereof, a helicopter kite 10 made in accordance with the present invention is shown to include a fuselage 12 having a transversely extending wing 14 secured adjacent to one front end thereof. The opposite rear end of the fuselage includes an integral tail 16 to which a bracket 18 is secured, such as by fasteners 19. A bearing bolt 20 carried by the upper extremity of the bracket 18 rotatably supports a tail hub rotor 21, spacer washers 25, and threadedly carries a securement nut 26, as is more clearly shown in FIGURE 3 of the drawing. The tail rotor hub 21 is provided with circumferentially spaced apart and radially extending bores 23 that receive the adjacent ends of a corresponding number of blade elements 24 secured in circumferentially spaced apart relationship by means of an annular ring 22. The tail rotor is thus supported for rotation within substantially the same plane as the plane of the fuselage 12.

Another bracket 28 adjustably secured to the upper extremity of the fuselage 12 intermediate the opposite ends thereof, such as by a bolt 29 and nut 31, includes an upwardly extending bearing shaft 32 that defines an acute angle with the general plane of the wing 14. Bearing washers 34 and a wing nut 40 rotatably secure the hub 36 of the main rotor 30 upon the shaft portion 32. The stop bolt 29' may be extended through either one of two bores 27 in the fuselage for securing the bracket in a vertical position or in the inclined position shown, to thus control the altitude of the main rotor 30 relative to the longitudinal axis of the fuselage. The main rotor hub 36 is also provided with a plurality of circumferentially spaced apart and radially extending bores 38 that receive the innermost ends of rotor blades 40 which are secured in spaced apart relationship by means of an annular ring 35, as is more clearly shown in FIGURE 2. This annular ring 35 is provided with circumferentially spaced apart openings through which the terminal portion 42 of the rotor blades 40 are extended.

The lower portion of the fuselage 12, intermediate the opposite ends thereof, is also provided with a pair of longitudinally spaced apart openings 44 through which ends of a bridle cable 46 are extended. This bridle 46 is secured to one end of a ground control cable 47 which is used to control the kite in flight, in a well known manner. The lower end of the fuselage 12 is also provided with landing gear 48 and a tail skid 50 to facilitate the landing of the kite with a minimum amount of shock and damage.

The operation of this kite will now be readily understood. The wings 14 sustain the kite in flight, while the wind rushing past the main rotor 30 and tail rotor effects rotation thereof in their respective planes. By removing the securement nut 26 of the tail rotor and wing nut 33 of the main rotor, both rotors may be conveniently disassembled, together with the wing 14, to facilitate the packing and storage of the kite when not in use.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A helicopter kite comprising, in combination, a fuselage, a wing secured transversely adjacent to one forward end of said fuselage, a tail integral with the opposite rear end of said fuselage, landing gear carried by a bottom portion of said fuselage intermediate the opposite ends thereof, ground control cable means secured to said fuselage, rotor means rotatably supported upon said fuselage above the level of said landing gear, said cable means comprising a bridle, longitudinally spaced apart openings in said bottom portion of said fuselage, said bridle being threaded through said spaced apart openings in said fuselage, a length of flexible cable secured at one end to said bridle having an opposite end for manipulation upon the ground for controlling the kite in flight, said rotor means comprising a main rotor, a main rotor bracket secured to an upper portion of said fuselage intermediate said wing and tail, and removable bolt means rotatably securing said main rotor upon said main bracket for rotation about an axis lying in a plane common to the vertical central plane of said fuselage, said main rotor being supported for rotation within a plane defining an acute angle with the plane of said wing, wherein said rotor means further comprises a tail rotor, and a tail bracket secured to said tail and rotatably supporting said tail rotor for rotation within a plane substantially common to the longitudinal central plane of said fuselage and substantially normal to the plane of rotation of said main rotor.

References Cited in the file of this patent

UNITED STATES PATENTS

| | | |
|---|---|---|
| 2,181,477 | Chupp | Nov. 28, 1939 |
| 2,222,402 | Carrasco | Nov. 19, 1940 |
| 2,493,704 | Tomczyk et al. | Jan. 3, 1950 |
| 2,781,989 | Hagood et al. | Feb. 19, 1957 |
| 2,793,829 | Brumfield | May 28, 1957 |
| 2,893,663 | Wilson | July 7, 1959 |

FOREIGN PATENTS

| | | |
|---|---|---|
| 420,824 | Italy | May 6, 1947 |
| 815,811 | France | Apr. 19, 1937 |